US008311028B2

(12) United States Patent
Obuchi et al.

(10) Patent No.: US 8,311,028 B2
(45) Date of Patent: Nov. 13, 2012

(54) RADIO COMMUNICATION APPARATUS AND RADIO COMMUNICATION METHOD

(75) Inventors: Kazuhisa Obuchi, Yokohama (JP); Hideto Furukawa, Yokohama (JP); Kazuo Kawabata, Yokohama (JP); Yoshiharu Tajima, Yokohama (JP); Yoshihiro Kawasaki, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 1033 days.

(21) Appl. No.: 11/415,087

(22) Filed: May 2, 2006

(65) Prior Publication Data
US 2007/0064635 A1    Mar. 22, 2007

(30) Foreign Application Priority Data
May 10, 2005  (JP) .................................. 2005-136999

(51) Int. Cl.
*H04B 7/212*   (2006.01)
(52) U.S. Cl. ........ 370/348; 370/328; 370/329; 370/330; 370/336; 370/345; 370/347; 455/450; 455/451; 455/452.1; 455/452.2; 455/453; 455/454; 455/509
(58) Field of Classification Search .................. 370/348, 370/328–330, 336, 345, 347; 455/450–454, 455/509
See application file for complete search history.

(56) References Cited

U.S. PATENT DOCUMENTS

| 6,069,886 A * | 5/2000 | Ayerst et al. .................. 370/336 |
| 2001/0021180 A1 | 9/2001 | Lee et al. |
| 2002/0051424 A1 | 5/2002 | Krishnamoorthy et al. |
| 2003/0012176 A1 * | 1/2003 | Kondylis et al. .............. 370/348 |
| 2003/0104786 A1 | 6/2003 | Jung et al. |
| 2004/0160916 A1 * | 8/2004 | Vukovic et al. ............... 370/332 |
| 2005/0032478 A1 * | 2/2005 | Stephens et al. ........... 455/67.11 |
| 2006/0034219 A1 * | 2/2006 | Gu et al. ....................... 370/329 |

FOREIGN PATENT DOCUMENTS

| EP | 1 073 301 | 1/2001 |
| JP | H09-055693 | 2/1997 |
| WO | 01/58054 | 8/2001 |
| WO | 03/047300 | 6/2003 |

* cited by examiner

*Primary Examiner* — Dwayne Bost
*Assistant Examiner* — Yungsang Lau
(74) *Attorney, Agent, or Firm* — Myers Wolin, LLC

(57) ABSTRACT

To provide a radio communication apparatus and a radio communication method in which change in the transmission rate is taken into consideration at the time of making transmission reservation. The present invention provides a radio communication apparatus for receiving the transmission reservation request with a radio transmitting/receiving unit and transmitting the reservation acknowledgement from the same radio transmitting/receiving unit. This radio communication apparatus is characterized in comprising a control unit for transmitting, from the radio transmitting/receiving unit, a plurality of reservation acknowledgments in different contents for a transmission reservation request in different timings.

13 Claims, 8 Drawing Sheets

Fig. 5

| MOBILE STATION IDENTIFYING INFORMATION (ID) | TRANSMISSION ACKNOWLEDGMENT TIMING | NUMBER OF RESERVED PACKETS | RE-NOTIFYING FLAG |
|---|---|---|---|
| MOBILE STATION 2 | TIMING #1 | 6 | OFF |
| MOBILE STATION 3 | TIMING #6 | 2 | ON |

RADIO COMMUNICATION APPARATUS AND RADIO COMMUNICATION METHOD

CROSS REFERENCE TO RELATED APPLICATION

This application is related to and claims priority to Japanese Application No. 2005-136999 filed May 10, 2005 in the Japanese Patent Office, the contents of which are incorporated by reference herein.

BACKGROUND OF THE INVENTION

1. Field of the Invention

The present invention relates to a radio communication apparatus and a radio communication method. As an example of the radio communication apparatus, a radio base station and a mobile station used in the mobile radio communication system introducing the W-CDMA (UMTS) communication system are considered. As an example of the radio communication method, a radio communication method used in this system may be thought.

2. Description of the Related Art

Data transmission between the radio communication apparatuses is conducted via the radio links. When a plurality of radio communication apparatuses (transmitting stations) are provided for data transmission and one radio communication apparatus (receiving apparatus) is provided for receiving the data from these transmission stations via a shared channel, the transmission timing must be controlled for these transmitting stations.

Such transmission timing control will be briefly explained with reference to FIG. 1.

FIG. 1 is a diagram for explaining the data transmitting method among the radio communication apparatuses, illustrating an example of transmission of packet data.

The radio communication apparatus A corresponds to a receiving station, while the radio communication apparatuses B and C, to the transmitting stations.

In the transmission method, a transmitting station B having the data (assumed as 120 Bytes for three packets) desired to be transmitted to the receiving station A transmits first a transmission reservation request (control packet data) to the receiving station A. This transmission reservation request includes the packet number information (assumed as 3) desired to be transmitted from the transmitting station B.

Upon reception of the transmission reservation request from the transmitting station B, the receiving station A evaluates acknowledgment or non-acknowledgment of acceptance of the reservation. When the other transmitting stations do not desire to make a transmission, the receiving station A accepts this transmission reservation request and transmits the reservation acknowledgment to the transmitting station B. This reservation acknowledgment includes a delay information (in this case, delay is not generated and therefore N=0) instructing to delay transmission timing of the packet data by N packets timing and a packet number information indicating the number of packets acknowledged for transmission.

Accordingly, upon reception of the reservation acknowledgment, the transmitting station B waits for the timing for transmission of N packets in accordance with the delay information (in this case, the nearest packet transmission timing) and transmits the packet data (40 Bytes) in this timing to the receiving station A.

The packet data is received with the receiving station A. Here, the receiving station A judges acknowledgment or non-acknowledgment of reception using error detection bits included in the receiving packet data. When reception is normally completed, the receiving station A transmits the ACK signal to the transmitting station B. The receiving station A transmits, when the packet data is not received normally, the NACK signal to the transmitting station B, urging the transmitting station B to retransmit the packet data.

Here, the transmitting station B transmits, because it receives the ACK signal, respective packet data (40 Bytes) to the receiving station A in the next packet transmission timing, and in the second next packet transmission timing.

As explained above, the transmitting data in total of 120 Bytes are transmitted to the receiving station A.

On the other hand, the transmitting station C also issues a transmission reservation request (for two packets) as illustrated in the figure to the receiving station A and receives the reservation acknowledgment from the receiving station A.

However, at the time of transmitting reservation acknowledgment, the receiving station has acknowledged transmission of the packet data of three packets to the transmitting station B but this transmission station B does not yet transmit the data of the last packet. Therefore, the receiving station sets, for the transmitting station C, the delay information to delay transmission of the packet data as long as the time corresponding to one packet transmission and also sets two packets as the packet number information.

Accordingly, the transmitting station C receives reservation acknowledgment but does not conduct transmission in the next packet data transmission timing and delays transmission for one packet and transmits the packet data in the second next packet data transmission timing.

The transmitting station C transmits the transmitting packet data of two packets in the same manner.

As the prior art for the communication system for reservation, Japanese patent publication document JP-A No. 1997-55693 is listed.

According to the related art explained above, since transmission reservation is conducted in accordance with amount of transmitting data at the transmitting station, the transmitting station can transmit smoothly the transmitting data by utilizing the reserved transmission timing.

However, here rises a problem when amount of data which can be transmitted in each transmission timing changes.

It is not known to allow change in amount of data which can be transmitted in each transmission timing when the transmission is reserved but the items explained below are a part of the items created by the inventors of the present invention.

These items will be explained with reference to FIG. 2.

Since the transmitting station B has the transmitting data of 120 Bytes, upon judgment from the transmission rate in accordance with the present radio environment that data transmission of 40 Bytes in each transmission timing is possible, the transmitting station B judges reservation of three packets is necessary and issues the transmission reservation request of three packets.

However, when the radio environment between the transmitting stations A and B is improve later and the transmission in the higher transmission rate (60 Bytes) is possible, transmission of data is completed with the transmission of two packets without using whole reserved transmission of three packets.

Therefore, the third packet indicated within the frame of dotted line has been reserved but this packet is not actually used as the transmission timing and this packet is no longer useful.

When the radio environment becomes bad, on the contrary, and the transmission rate which is lower than the reserved rate must be used, deviation from the reservation is generated, resulting in competition with the next reservation (refer to competition area in FIG. 3).

SUMMARY OF THE INVENTION

Accordingly, an object of the present invention is to provide a radio communication apparatus and a radio communication method in which changes in the transmission rate is taken into consideration to reserve the transmissions.

In addition to the object explained above, the effect attained with each structure indicated in the best mode for carrying out the present invention explained later but cannot be attained with the background art can also understood as one of the objects of the present invention.

(1) The present invention utilizes a radio communication apparatus for receiving a transmission reservation request with a radio transmitting/receiving unit and transmitting reservation acknowledgment from the transmitting/receiving unit, the radio communication apparatus comprising a control unit for controlling the radio transmitting/receiving unit to transmit a plurality of reservation acknowledgments in different timing for a transmission reservation request.

(2) Preferably, the control unit controls the radio transmitting/receiving unit to transmit any one reservation acknowledgment after the first acknowledgement among the plurality of reservation acknowledgments within the period in which the transmission of a radio communication apparatus which has transmitted the transmission reservation request is limited by the first reservation acknowledgment.

(3) Preferably, the reservation acknowledgment to be transmitted later in timing among a plurality of reservation acknowledgments has the meaning to change the transmission timing acknowledged with the preceding reservation acknowledgment transmitted in timing.

(4) Preferably, the change in transmission timing has been implemented in accordance with the transmitting conditions of the other radio communication apparatus having issued a transmission reservation.

(5) Preferably, when the transmission rate of the other radio communication apparatus becomes higher in accordance with the radio communication environment of the other radio communication apparatus and thereby transmission of the other radio communication apparatus is completed quicker than the transmission schedule, the transmission in earlier timing is acknowledged with the change in the transmission timing and when the transmission of the other radio communication apparatus is completed later than the transmission schedule, the transmission in delayed timing is acknowledged with the change in the transmission timing.

(6) Preferably, the control unit controls the radio transmitting/receiving unit to transmit, to the other radio communication apparatus, a transmission rate changing instruction for the other radio communication apparatus in accordance with the radio communication environment of the other radio communication apparatus having issued the transmission reservation and changes the transmission timing acknowledged with the first reservation acknowledgment to the earlier transmission timing with the second or subsequent reservation acknowledgements among a plurality of reservation acknowledgments, when data transmission in regard to the other radio communication apparatus is completed earlier than the schedule of the transmission reservation, on the basis of the contents of the transmission rate changing instruction and the amount of transmission data acquired at the time of transmission reservation of the other radio communication apparatus.

(7) Preferably, a period between the first transmission for reservation acknowledgment among the plurality of reservation acknowledgments and any one transmission for reservation acknowledgment after the first transmissions for reservation acknowledgments is set no less than a predetermined time period.

(8) The present invention utilizes a radio communication apparatus for transmitting a transmission reservation request from a radio transmitting/receiving unit and receiving a reservation acknowledgment with the radio transmitting/receiving unit, the communication apparatus comprising a control unit for receiving, in different timings, a plurality of reservation acknowledgments for a transmission reservation request with the radio transmitting/receiving unit and controlling the radio transmitting/receiving unit to transmit data in accordance with at least one or more reservation acknowledgments among the plurality of reservation acknowledgments.

(9) The present invention utilizes a radio communication apparatus for changing a transmission rate by changing a transmission format in accordance with the radio communication environment, the radio communication apparatus comprising a radio transmitting/receiving unit for transmitting a transmission reservation request and receiving a transmission acknowledgment as a response to the transmission reservation request, and a control unit for restricting the change of the transmission format during the period until the data transmission in accordance with the transmission acknowledgment.

(10) The present invention utilizes a radio communication method for reserving transmission by transmitting a transmission reservation request from a transmitting station and transmitting a transmission acknowledgment to the transmitting station in accordance with the transmission reservation from a receiving station, the method comprising a step of transmitting, to the transmitting station, a plurality of reservation acknowledgments in different timings from the receiving station for a transmission reservation request from the transmitting station.

BRIEF DESCRIPTION OF THE DRAWINGS

FIG. 5 shows a diagram illustrating storage contents of a storage unit 14 of the present invention.

DESCRIPTION OF THE PREFERRED EMBODIMENTS

The preferred embodiments of the present invention will be explained with reference to the accompanying drawings.

[a] Explanation of First Embodiment

In this embodiment, change in the transmission rate at the time of conducting transmission reservation is taken into consideration.

Namely, a radio communication apparatus (transmitting station) transmits a transmission reservation request and a radio communication apparatus (receiving station) having received this transmission reservation request transmits transmission acknowledgment to this transmitting station. However, this transmitting station is capable of transmitting the second transmission acknowledgment, considering that transmission to the other radio communication apparatus can be assumed to be completed earlier or later than the transmission schedule.

Accordingly, if transmitting condition changes in the other radio communication apparatuses and situation is thereby changed from that of the first transmission acknowledgment, the transmission acknowledgment can be changed again with the second transmission acknowledgment.

As the radio communication apparatus, various types of apparatus for communication using radio link can be employed. Here, a mobile communication apparatus is used as an example. Accordingly, a mobile station and a base station correspond to the radio communication apparatus.

Radio Communication Apparatus

Figure 1:
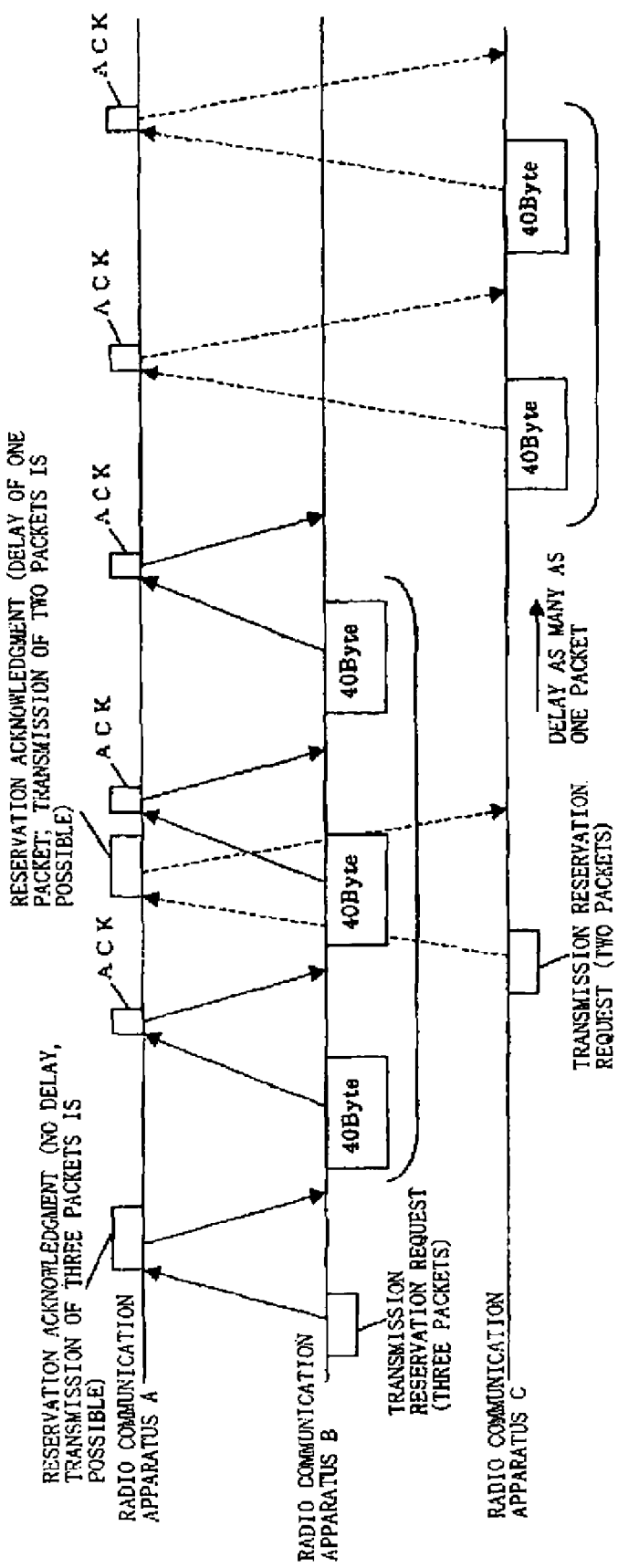
FIG. 1 shows a diagram for illustrating the packet transmitting method of the related art.
Figure 2:
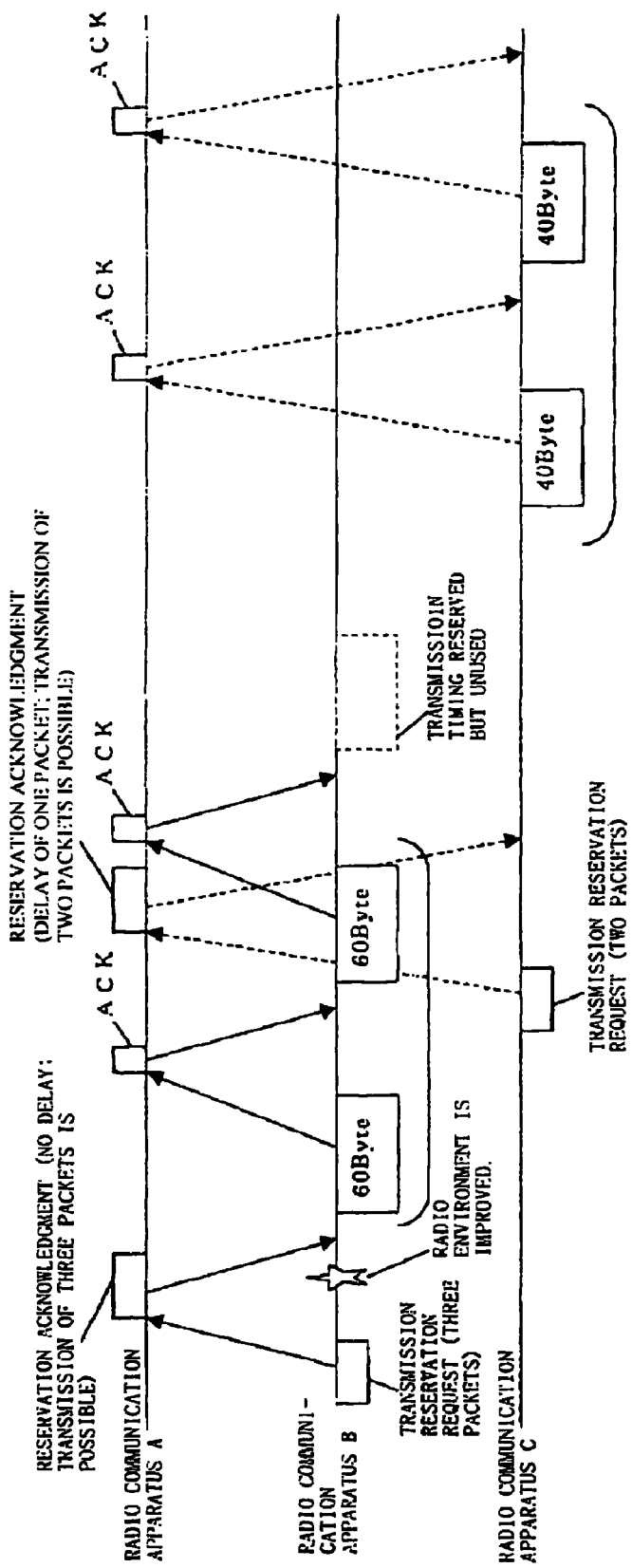
FIG. 2 shows a diagram (No. 1) for explaining problems.
Figure 3:
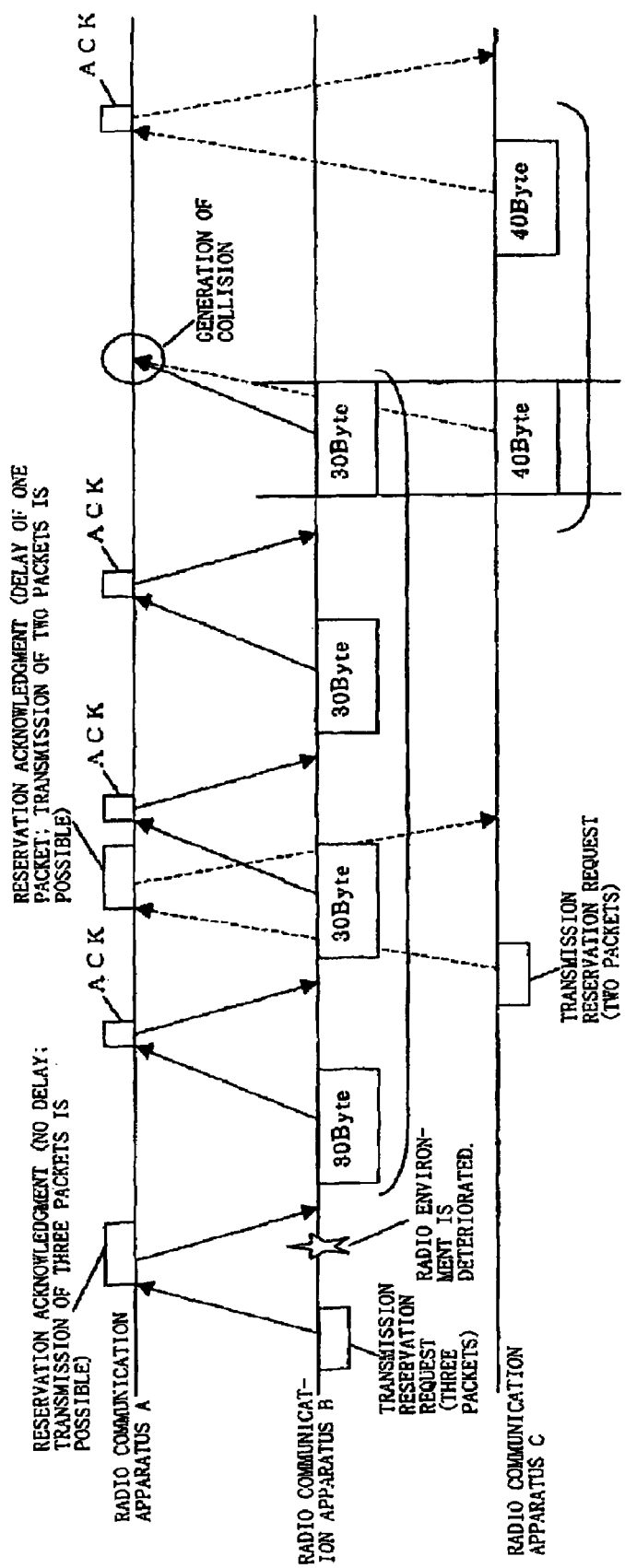
FIG. 3 shows a diagram (No. 2) for explaining problems.
Figure 4:
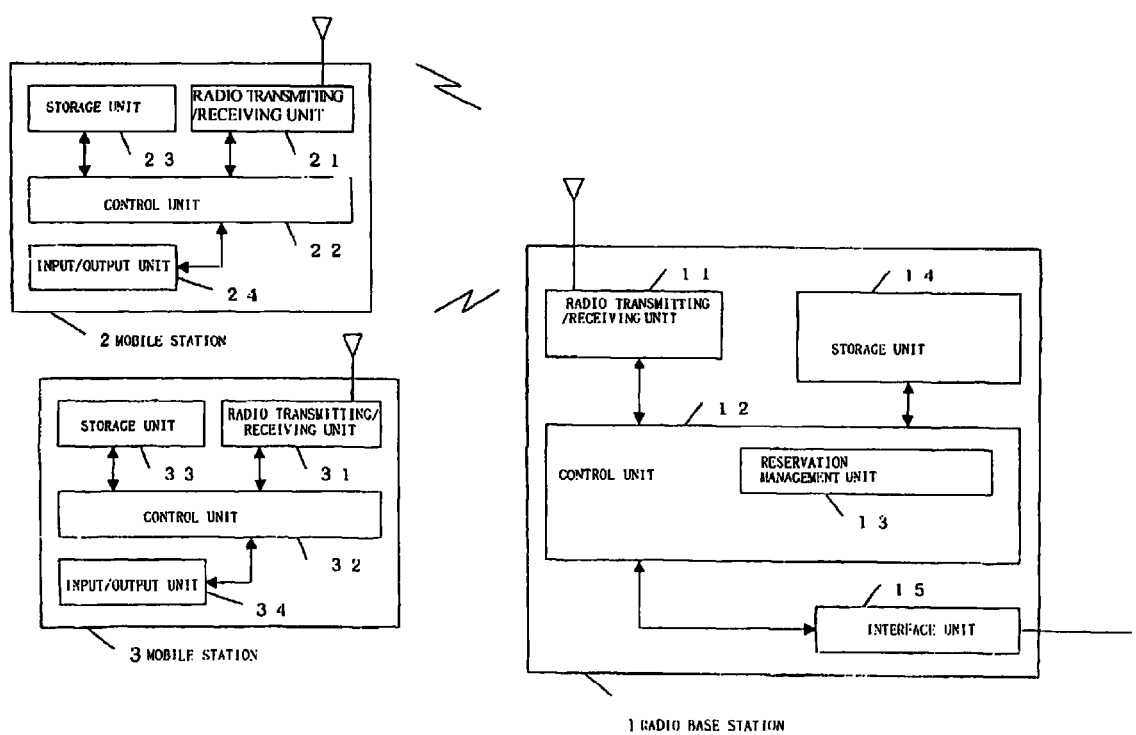
FIG. 4 shows a diagram illustrating a radio communication apparatus of the present invention.

FIG. 4 illustrates radio communication apparatuses (mobile station, base station) in the present invention. As a mobile communication system, various systems can also be assumed. However, a mobile communication system corresponding to CDMA like a W-CDMA (UMTS) is used here. Of course, it is also possible to use a next generation mobile communication system employing OFDM.

In FIG. 4, numeral 1 denotes a radio base station (receiving station); 2, a mobile station (transmitting station); 3, a mobile station (transmitting station), respectively.

The radio base station 1 comprises a radio transmitting/receiving unit 11 for radio transmission and reception to and from mobile stations, a control unit 12 for controlling each unit, a storage unit 14 for storing various parameters, and an interface unit 15 for making communication with a host network side. The radio transmitting/receiving unit 11 includes a well-known spreading (de-spreading) unit corresponding to the CDMA system and generates the signal spread with the spreading unit as the transmitting signal and also obtains the de-spreading signal from the de-spreading unit as the receiving signal.

The control unit 12 is provided, as a function among those thereof, with a reservation management unit for reservation management of the transmission reservation requests from the mobile stations.

Namely, upon reception of a transmission reservation request from a mobile station, the control unit 12 gives contents thereof to the reservation management unit 13. The reservation management unit 13 refers to the reservation information managed and stored in the storage unit 14 and generates the reservation acknowledgment to such reservation request to give it to the control unit 12. Thereby, transmission to the mobile station from the radio transmitting/receiving unit 11 can be realized.

An example of the reservation information to be stored in the storage unit 14 is illustrated in FIG. 5.

As illustrated in the figure, the reservation information is formed, corresponding to the identification information (ID) of the mobile stations, of a transmission acknowledgment timing (timing for notifying start of transmission), the number of reserved packets (number of packets acknowledging transmission with reservation (and/or amount of data)), and re-notification flag (flag indicating re-transmission of transmission acknowledgment).

Returning to FIG. 4, the mobile stations 2 and 3 are formed in the same manner, comprising a radio transmitting/receiving unit 21 (31) for radio communication with the radio transmitting/receiving unit 11 of the radio base station, a control unit 22 (32) for controlling each unit, a storage unit 23 (33) for storing various parameters, and an input/output 24 (34) for inputting and outputting data.

The basic structure has been explained above, but the mobile stations 2, 3 are desirable to be capable of changing transmission rate of transmitting data in accordance with the radio environment.

For example, it is desirable to employ the AMC, adaptive modulation and coding, control being introduced in the HSDPA by replacing the functions of the mobile station and radio base station.

Namely, the mobile station 2 (3, same as subsequently) transmits the pilot signal to the radio base station 1 in order to enable observation of environment of the up-link in the radio base station 1. The radio base station 1 measures the reception quality of the received pilot signal and evaluates the condition of the up-link. When the radio environment is good, the radio base station 1 instructs the transmission format enabling high speed transmission to the mobile station 2. When the radio environment is deteriorated, on the contrary, the radio base station 1 instructs the transmission format enabling the lower transmission rate to the mobile station 2. This instruction is desirably issued periodically (particularly, period until completion of transmission after issuance of the transmission reservation request).

Accordingly, the mobile station 2 is capable of conducting the radio transmission by utilizing the latest transmission format which the radio base station 1 instructed.

As an example of change in the transmission format, it is considered to increase the transmission rate by changing QPSK to 16AQM or to increase the amount of data to be transmitted with single transmission by increasing the number of spreading codes to be assigned.

Transmitting Method (No. 1)

Figure 6:
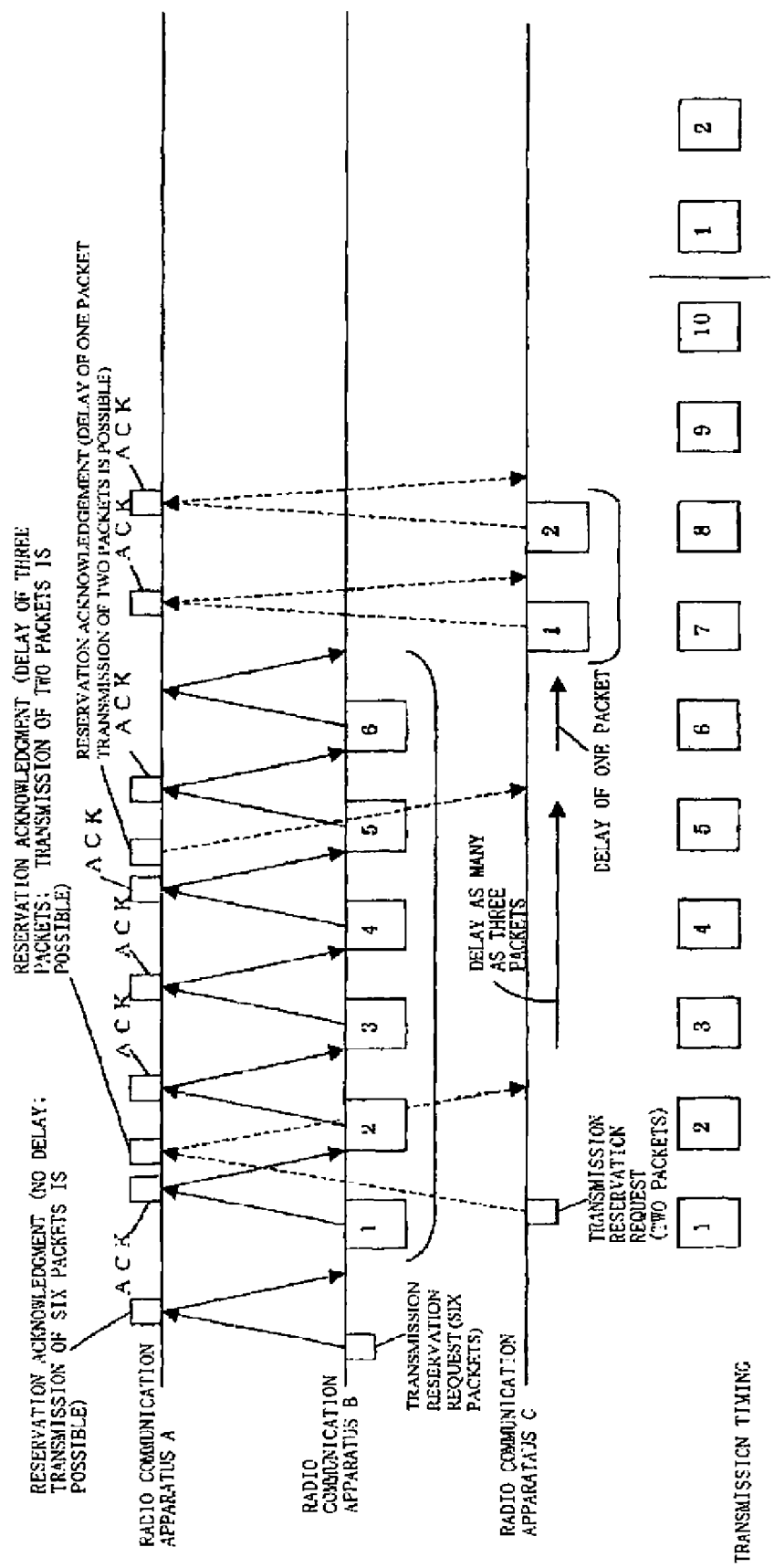
FIG. 6 shows a diagram illustrating a transmitting method (No. 1) of the present invention.

Next, an example of the transmitting method in the present invention will be explained with reference to FIG. 6.

In the figure, the radio communication apparatus A corresponds to the radio base station 1, while the radio communication apparatuses B and C, to the mobile stations 2 and 3, respectively, because application to the mobile communication system is assumed.

In the figure, the number indicated by repeating the transmission timings 1 to 10 indicates the slot number of the shared channel which is shared by a plurality of mobile stations for data transmission such as packet data or the like. It is of course possible to use the same slot number with a plurality mobile stations by utilizing the quadrature and different spreading codes, but in this example, the mobile stations 2 and 3 do not use the same slot from the view point of the problem of multiplexing level or the like.

Moreover, transmission reservation request and reservation acknowledgment may be transmitted with the same channel as the packet data but such data are transmitted and received in this embodiment using the different control channels.

Next, the transmitting method will be explained along the flow of time axis.

To the mobile station 2 (transmitting station B), the data is inputted as the transmitting data via the input/output unit 24. When transmission to the radio base station 1 is requested, the control unit 22 generates a transmission reservation request.

Desirably, the control unit 22 evaluates the number of transmission timings required ([D/R], here [N] is the minimum natural number equal to or larger than N) and includes the [D/R] to the transmission reservation request as the transmitting packet number information by calculating amount of data (D) of the transmitting data and also calculating the amount of data (R) to be transmitted with the single transmission timing when the data is transmitted in the latest transmission format considering the radio environment. It is of course possible that the amount of transmitting data D is included to the transmission reservation request in place of or in association with [D/R].

When it is assumed here that [D/R] is equal to 6, the radio base station 1 (receiving station A) confirms the reservation information (in this stage, transmission is not yet reserved) by referring to the storage unit 14 and transmits the delay information (in this case, N=0 because delay is not yet necessary) and the packet number information (6, in this case) indicating the number of packets to be acknowledged in transmission.

In this case, the reservation management unit 13 stores the timing #1 allowing start of transmission of packet data and the reserved packet number 6 to the data region corresponding to the mobile station 2 of FIG. 5 and also sets the re-notification flag to OFF state.

Here, no-delay is used as the delay information because transmission is not yet reserved and restriction is not required for transmission and the number of packets is set to 6 because it is within the allowable range of assignment.

Upon reception of reservation acknowledgment, the mobile station 2 recognizes that the request of the own station has been accepted and package data can be transmitted without any delay and also transmits a part of the transmitting data to the radio base station 1 as the packet data in the nearest transmission timing #1.

The radio base station 1 evaluates whether the receiving data (packet) is normal (correct) or not by conducting detection check such as the CRC check or the like for the receiving check and notifies the result to the mobile station 2 (here, it is assumed that the receiving data is completely normal and the ACK signal is thereby notified).

The mobile station 2 having received the ACK signal transmits the remaining packet data in the reserved remaining transmission timings #2 to #6 and completes the transmission in the timing #6.

In this example, the radio environment changes only a little during the period up to the transmission timing #6 from transmission of the transmission reservation request and therefore it is assumed that the all slots up to #6 from #1 must be used without changing the transmission format or the all slots up to #6 from #1 must be used with a little bit changing of the transmission format.

On the other hand, the data is inputted to the mobile station 3 (transmitting station C) as the transmitting data via the input/output unit 34. When transmission to the radio base station 1 is requested, the control unit 32 generates the transmission reservation request as in the case of the mobile station 2.

Here, when [D/R] is assumed as 2, the radio base station 1 checks the reservation information by referring to the storage unit 14. Since reservation is already completed for the mobile station 2 in this case, it is impossible that transmission is acknowledged for the mobile station 3 immediately.

Accordingly, the reservation management unit 13 controls storage unit 1 to store #6 (one of the reserved transmission timings for the mobile station 2) as the transmission acknowledgment timing and 2 as the reserved number of packets for mobile station 3. In this case, when packet transmission to the mobile station 2 is assumed to be completed as scheduled, competition will be generated in the transmission between the mobile stations 2 and 3 and the re-notification flag is set to ON.

Then the reservation information including the delay information (in this case, number of delays N=3) and the packet number information (2, in this case) indicating the number of packets acknowledged for transmission is transmitted to the mobile station 3. Here, the number of delays 3 is used for acknowledging the transmission in the transmission timing #6 to the mobile station 3.

The mobile station 3 having received reservation acknowledgment recognizes that the request of the own station has been accepted but delay of three slots is necessary for transmission of the packet data. Therefore, the control unit 32 controls the radio transmitting/receiving unit 31 to the transmission waiting condition until the transmission timing becomes the slot #6.

However, since reservation acknowledgment is transmitted again from the radio base station 1 at the preceding timing of the transmission timing #6, the control unit 32 control the radio transmitting/receiving unit 31 to receive such reservation acknowledgment.

It is also allowed to check whether the reservation acknowledgment has been transmitted to the station or not through every receiving operations in each timing where the reservation acknowledgment can be transmitted as the control information. But, it is more desirable from the viewpoint of power consumption that reception is restricted to the timing before the predetermined time with reference to the slot in which transmission is acknowledged. In this case, it is desirable, from this reference, for the radio base station 1 to control re-transmission of the reservation acknowledgment before the predetermined time.

In this example, since the re-notification flag is set to ON in the reservation management unit 13 of the radio base station 1, this unit 13 evaluates the transmitting condition of the mobile station 2 before the transmission timing of the mobile station 3.

For example, the remaining number of packets (assumed) is included in the packet data of the mobile station 2 to check whether all transmission timings having acknowledged reservation to the mobile station 2 are used or not.

Moreover, whether all transmission timings having acknowledged reservation are used or not is evaluated by forecasting the remaining number of packets required by transmitting the amount of transmitting data included in the reservation information and the amount of remaining data obtained with difference from the amount of data already received in the transmission rate which is determined by the latest transmitting format notified to the mobile station 2.

When it is assumed here that the packets have been transmitted as schedule, the radio base station 1 transmits again the reservation acknowledgment to the mobile station 3 before the transmission timing #6 (namely, within the period where transmission of packet data can be limited for the mobile station 3).

In this case, the reservation acknowledgment including delay information (number of delays N=1, in this case) and the packet number information (2, in this case) indicating the number of packets acknowledged for transmission is transmitted to the mobile station 3.

Here, the number of delay is set to 1 in order to give transmission acknowledgment to the mobile station 3 so that the packet data can be transmitted in the next transmission timing because transmission of packets of the mobile station 2 is completed as reserved.

Accordingly, the mobile station 3 receives the repeated reservation acknowledgement. Then the control unit 32 recognizes changing of the transmission timing and controls the radio transmitting/receiving unit 31 to transmit the packet data in the transmission timings in accordance with the latest reservation acknowledgment (repeated reservation acknowledgment). Desirably, the repeated reservation acknowledgment is assumed not to be duplicated with the transmission timing already reserved to the mobile station 2. It is also desirable that the transmission timing for the mobile station 3 is updated to 7 among the reservation information indicated in FIG. 5 and the re-notification flag is set to OFF.

Of course, it is possible the third and fourth reservation acknowledgments are transmitted to the mobile station 3 and such transmission can follow changes in the transmitting conditions in the course of the transmission of the mobile station 2.

As explained above, the transmission timing can be changed through the control in accordance with the transmitting conditions of the other mobile stations by transmitting a plurality of reservation acknowledgments, wherein contents of these acknowledgement are different or transmission timings indicated by these acknowledgement are different, to a (specially, only one) transmission reservation request in different timings from the radio transmitting/receiving unit of the radio base station 1. Note that a plurality of reservation acknowledgments may have same contents, fore example contents indicate a following next transmission timing, because the each transmission timing indicated by the plurality of reservation acknowledgments is different each other as long as the transmission timing of the plurality of reservation acknowledgments are different respectively.

Moreover, the mobile station 3 is capable of turning OFF the power supply of the radio transmitting/receiving unit during the period of time T from reception of the first reservation acknowledgment and/or acquire the time for searching peripheral cells (measurement of reception quality) by introducing the rule that the N-th (N is 2, 3 or the like) reservation acknowledgment is transmitted with the interval of the predetermined time (T) for the first reservation acknowledgment. This predetermined time T may be stored previously to the storage unit within the mobile station or may be notified to the mobile station by informing to the mobile station in the cell as the notification information from the radio base station 1.

In the embodiment explained above, it is possible to control the mobile station not to conduct the excessive receiving operations with expectation for possibility of the repeated transmission of reservation acknowledgment by including the identification information to conduct or not conduct the repeated reservation acknowledgment at the time of transmission of the first reservation acknowledgment.

For example, such control is particularly effective when the number of packets already reserved to the other mobile stations is less than the predetermined value.

Moreover, like the other transmitting method explained below, in the following example, the transmission timing duplicated with that already reserved to the mobile station 2 is included to the first reservation acknowledgment for the mobile station 3. However, it is also possible to change the transmission timing to be notified with the repeated reservation acknowledgment without duplication in the first reservation acknowledgment.

Transmitting Method (No. 2)

Figure 7:
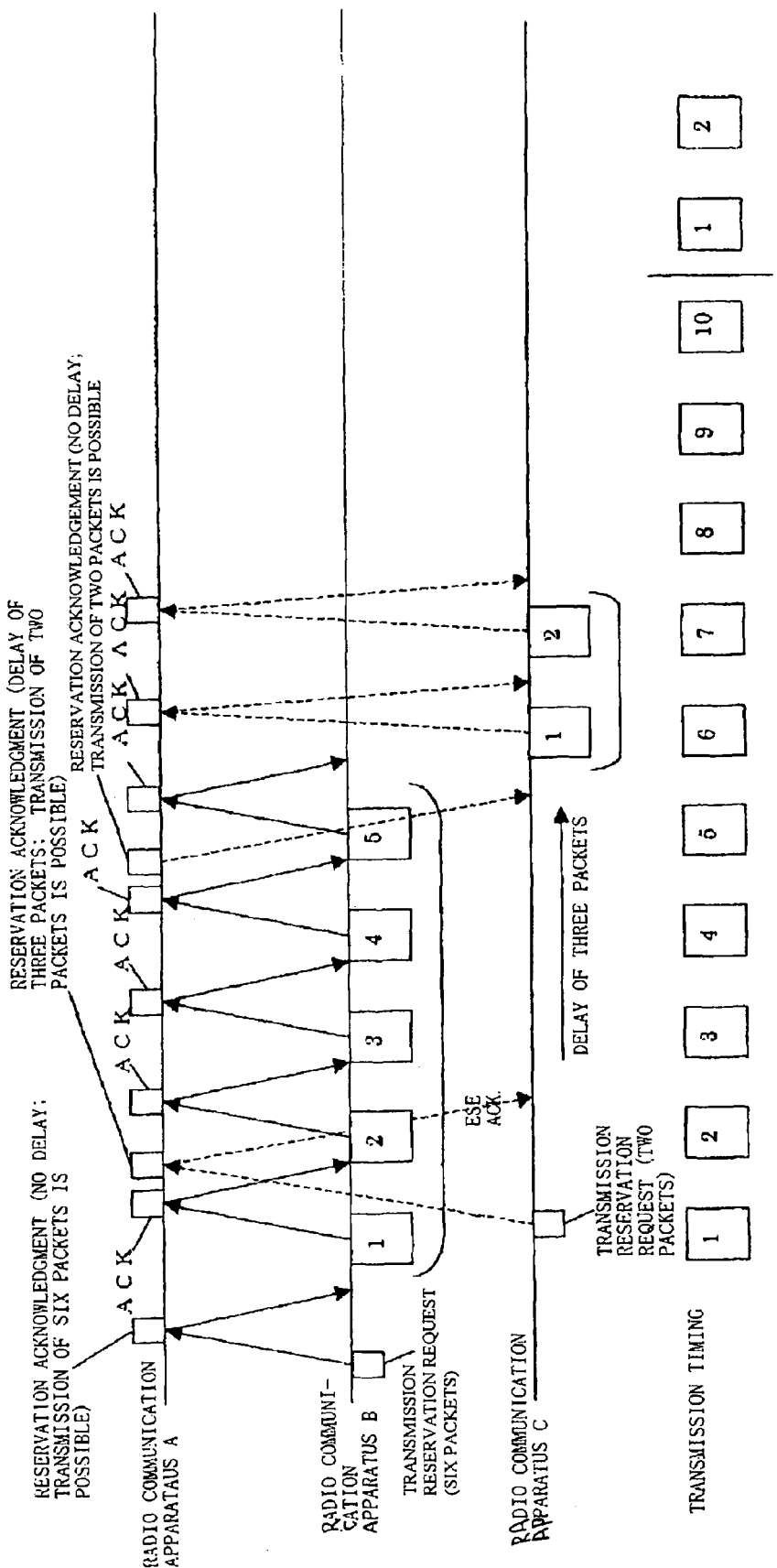
FIG. 7 shows a diagram illustrating a transmitting method (No. 2) of the present invention.

In the transmitting method (No. 1), the packet transmission of the mobile station 1 has been conducted as reserved. In this example, however, the transmission has been completed without use of a part of the reserved transmission timings (refer to FIG. 7).

As explained previously, since the mobile station 2 is capable of changing transmission rate in accordance with the radio environment (for example, changed in accordance with the instruction to change the transmission format from the radio base station 1), transmission of the packet data is completed earlier than the schedule when the radio environment has been changed better than that at the time of issuing the transmission reservation request.

As explained previously, since the re-notification flag for the mobile station 3 is set to ON in the reservation management unit 13 of the radio base station 1, the control unit 12 evaluates whether all transmission timings having acknowledged reservation to the mobile station 2 are used or not by using information of the remaining number of packets which is included in the packet data from the mobile station 2.

Moreover, it is also evaluated whether all transmission timings having acknowledged reservation are used or not by forecasting the number of remaining packets required when the amount of data obtained by subtracting the amount of data already received from the amount of transmitting data included in the reservation information are transmitted in the transmission rate determined with the latest transmission format notified to the mobile station 2.

Here, when it is assumed that the number of transmitting packets are reduced as many as one packet due to increase of transmission rate, the reservation management unit 13 generates reservation acknowledgment and gives it to the control unit 12 so that reservation acknowledgment is transmitted to the mobile station 3 sufficiently before the transmission timing #6 in view of effectively using the transmission timing #6 reserved for the mobile station 2.

Accordingly, repeated reservation acknowledgment is transmitted to the mobile station 3 from the radio transmitting/receiving unit 11 under the control of the control unit 12. Of course, the reservation management unit 13 turns OFF the re-notification flag for the mobile station 3 stored in the storage unit 14.

Since this reservation acknowledgment enables transmission in the transmission timing #6, the reservation acknowledgment including the delay information (number of delays N=0, in this case) and the packet number information indicating the number of packets acknowledging transmission (2, in this case) is transmitted to the mobile station 3.

Accordingly, the control unit 32 of the mobile station 3 having received the repeated reservation acknowledgment controls the radio transmitting/receiving unit 31 to transmit the packet data in the transmission timing #6.

In this example, since the first transmission timing happens to be used in direct, it is also possible not to transmit the repeated reservation acknowledgment from the radio base station 1.

In this case, since the control unit 32 of the mobile station 3 does not receive the repeated transmission acknowledgment, the radio transmitting/receiving unit 31 is controlled to transmit the packet data in accordance with the first transmission acknowledgment.

Moreover, when packet transmission of the mobile station 2 has completed more quickly, earlier transmission timing (#5 or the like) is notified as the reservation acknowledgment to the mobile station 3. In this case, the reservation management unit 13 of the radio base station 1 changes, of course, the transmission acknowledgment timing for the mobile station 3 in the storage unit 14 to #5.

The reservation information for the mobile station 2 having completed transmission may be deleted at this timing.

Transmitting Method (No. 3)

Figure 8:
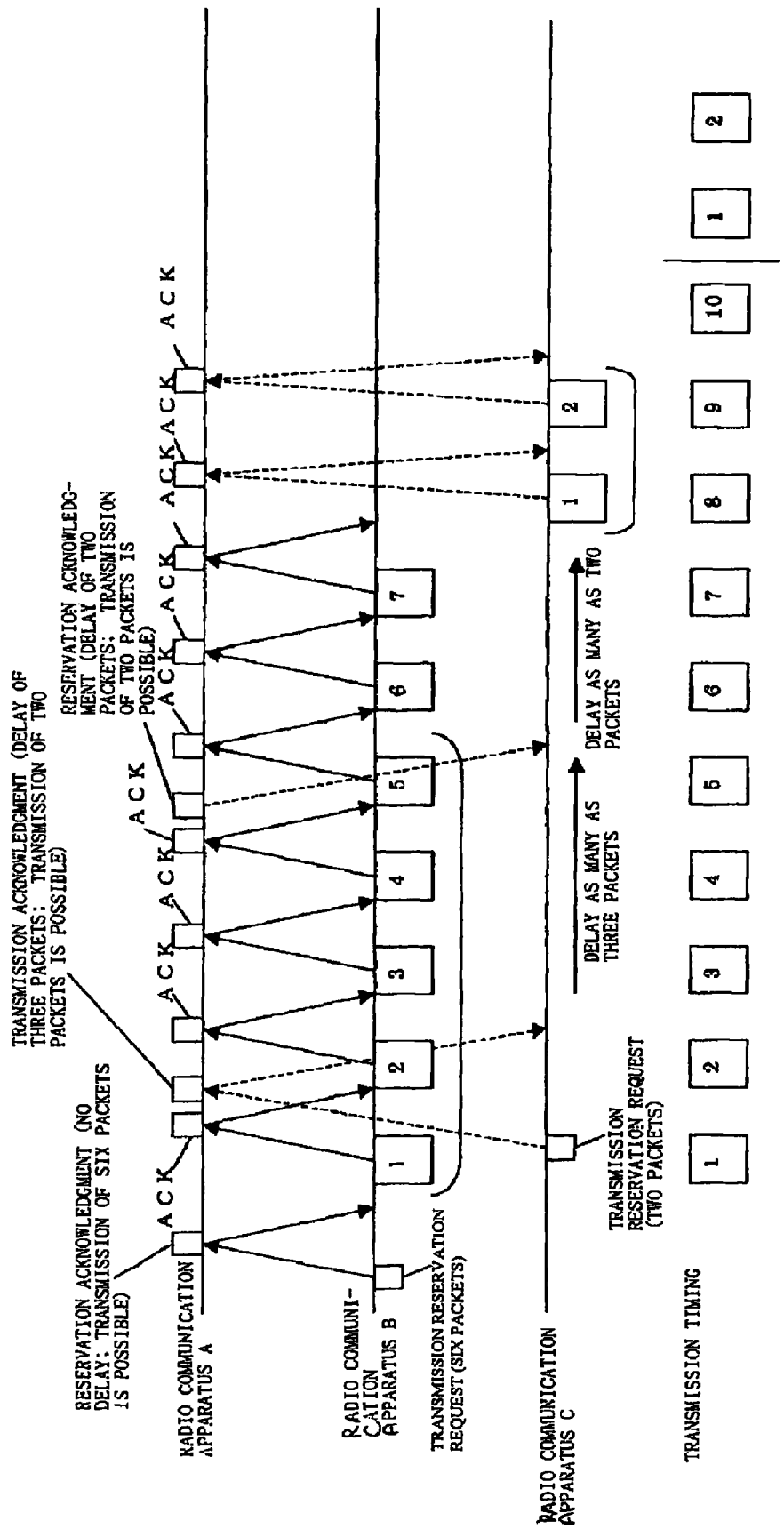
FIG. 8 shows a diagram illustrating a transmitting method (No. 3) of the present invention.

In this example, the reserved transmission timings becomes shortage (refer to FIG. 8).

As explained previously, since the mobile station 2 is capable of changing the transmission rate in accordance with the radio environment (for example, changed in accordance with the instruction for changing the transmission format from the radio base station 1), transmission of packet data is completed later than the schedule if the radio environment becomes worse than that at the time of issuing the transmission reservation request.

As explained above, since the re-notification flag is set to ON for the mobile station 3 in the reservation management unit 13 of the radio base station 1, whether all transmission timings acknowledged reservation to the mobile station 2 are used nor not is evaluated by including the number of remaining packets as schedule in the packet data from the mobile station 2.

Moreover, whether all transmission timings acknowledged reservation are used or not is evaluated by forecasting the number of remaining packets required when the amount of data obtained by subtracting the amount of data already received from the amount of transmitting data included in the reservation information are transmitted in the transmission rate determined with the latest transmission format notified to the mobile station 2.

Here, when it can be assumed that the number of transmitting packets is increased as many as one packet due to reduction of transmission rate, the reservation management unit 13 generates reservation acknowledgment and gives it to the control unit 12 so that the repeated reservation acknowledgment is transmitted to the mobile station 3 sufficiently before the transmission timing #6 having acknowledged transmission for the mobile station 3.

Accordingly, repeated reservation acknowledgment is transmitted to the mobile station 3 from the radio transmitting/receiving unit 11 under the control of the control unit 12. In the reservation management unit 13, re-notifying flag for the mobile station 3 stored in the storage unit 14 is turned OFF. When packet transmission of the mobile station 2 is greatly delayed from the schedule and it is further requested to transmit the packets larger than the predetermined number of packets, the re-notification flag can be maintained to ON state for further notification of a plurality of packets.

Since this reservation acknowledgment enables transmission in the transmission timing #8, the reservation acknowledgement including the delay information (number of delays N=2, in this case) and packet number information (2, in this case) indicating the number of packets acknowledged transmission is transmitted to the mobile station 3.

Accordingly, the control unit 32 of the mobile station 3 having received the repeated reservation acknowledgment controls the radio transmitting/receiving unit 31 to transmit the packet data in the transmission timing #8.

As explained above, since it is possible that reservation acknowledgments of different contents can be transmitted for a plurality of times, temporary reservation acknowledgment can be realized for the mobile stations and thereby true reservation acknowledgment can be granted with the repeated reservation acknowledgment.

Moreover, in each transmitting method explained above, it is also possible to acknowledge, to the mobile station 3, the transmission timing which is delayed only by the predetermined time from the reserved transmission timing for the mobile station 2 at the time of the first reservation acknowledgment for the mobile station 3. It is also possible to conduct re-transmission (re-transmission, for example, according to H-ARQ) against receiving errors in the radio base station 1 with respect to packets transmitted from the mobile station 2. However, it is necessary to provide a margin of the predetermined time between the last transmission timing for the mobile station 2 and the first transmission timing for the mobile station 3 by indicating corresponding timing to each mobile station respectively as reservation acknowledgement.

When the re-transmission is not conducted and the transmission rate rises in the transmission of packets of the mobile station 2, the repeated reservation acknowledgment can be utilized for advancing the timing for acknowledging transmission to the mobile station 3.

[b] Explanation of Second Embodiment

In this embodiment, the control unit 22 (23) of the mobile stations 2, 3 changes the transmission rate by changing the transmission format in accordance with the radio environment. However, when transmission acknowledgment, which is received by transmission of the transmission reservation request, is received, change of transmission format is restricted during data transmission in accordance with transmission acknowledgment.

Namely, the mobile station 2 (3) calculates [D/R] on the basis of the amount D of the transmitting data and the amount of data R which can be transmitted only with a single transmission in the transmission format (for example, transmission format designated by the radio base station 1) in accordance with the latest radio environment and transmits the transmission reservation request with inclusion of the number of packets [D/R].

When the mobile station 2 receives the reservation acknowledgment (acknowledging transmission of the number of packets [D/R]) indicating acceptance of the transmission reservation request from the radio base station 1, the control unit 22 effectuates restriction not to conduct the control to change the transmission format in accordance with the latest radio environment at the time of transmitting the packet data.

For example, the transmission format which has been referred at the time of generating the transmission reservation request is adapted uniformly as the transmission format in the period until the completion of packet transmission in accordance with reservation acknowledgment.

Accordingly, change in the radio environment can be suitably employed within the scope not giving adverse effect to transmission reservation.

According to the each embodiment, it is possible to provide a radio communication apparatus and a radio communication method in which change in the transmission rate at the time of conducting transmission reservation has been taken into consideration.

What is claimed is:

1. A radio communication system for receiving a transmission reservation request and transmitting a reservation acknowledgment that indicates a reserved transmission timing, the radio communication system comprising:
   a control unit that controls transmission of a plurality of reservation acknowledgments in response to one transmission reservation request, wherein in response to the one transmission reservation request, a reservation acknowledgment to be transmitted after a previously transmitted reservation acknowledgment indicates a reserved transmission timing different from the reserved transmission timing acknowledged by the previously transmitted reservation acknowledgment.

2. The radio communication system according to claim 1, wherein the control unit controls a radio transmitting unit to transmit any one reservation acknowledgment after a previously transmitted reservation acknowledgement among the plurality of reservation acknowledgments to be within a period of the transmission timing acknowledged in the previously transmitted reservation acknowledgment.

3. The radio communication system according to claim 1, wherein a change in the reserved transmission timing is implemented in accordance with the transmitting conditions of another radio communication system.

4. The radio communication system according to claim 3, wherein, referring to the reservation acknowledgment to be transmitted after a previously transmitted reservation acknowledgment, which indicates a reserved transmission timing different from the reserved transmission timing acknowledged by the previously transmitted reservation acknowledgment, when a transmission rate of the other radio communication system becomes higher in accordance with a radio communication environment of the other radio communication system and thereby transmission of the other radio communication system is completed quicker than a transmission schedule, the change in the reserved transmission timing indicates an advancement of the reserved transmission timing from the reserved transmission timing acknowledged in the previously transmitted reservation acknowledgment; and when the transmission of the other radio communication system is completed later than a transmission schedule, the change in the reserved transmission timing indicates a later reserved transmission timing from the reserved transmission timing acknowledged in the previously transmitted reservation acknowledgment.

5. The radio communication system according to claim 3, wherein, the control unit controls a radio transmitting unit to transmit to the other radio communication system a transmission rate changing instruction in accordance with the radio communication environment of the other radio communication system and the control unit controls to change the transmission timing acknowledged with a first reservation acknowledgment with a second or subsequent reservation acknowledgement among the plurality of reservation acknowledgments when data transmission in regard to the other radio communication system will be completed earlier or later than the schedule of the transmission reservation on the basis of the contents of the transmission rate changing instruction and the amount of transmission data acquired or remaining to be transmitted from the other radio communication system.

6. The radio communication system according to claim 1, wherein a period between a first transmission for reservation acknowledgment among the plurality of reservation acknowledgments and any one transmission for reservation acknowledgment after the first transmissions for reservation acknowledgment is set greater than or equal to a predetermined time period.

7. The radio communication system according to claim 1, wherein the radio communication is for mobile communication and said radio communication system is a base station and said transmission reservation request is transmitted from a mobile station.

8. The radio communication system according to claim 1, wherein the plurality of reservation acknowledgments have same contents but indicate different timing respectively.

9. The radio communication system according to claim 1, wherein a first transmitting reservation acknowledgment includes identification information indicating whether further transmitting reservation acknowledgment will be transmitted.

10. A radio communication system for transmitting a transmission reservation request and receiving a reservation acknowledgment that indicates a reserved transmission timing, the communication system comprising:

a control unit that controls reception of a plurality of reservation acknowledgments received in response to one transmission reservation request and controls transmission of data in accordance with at least one reservation acknowledgment among the plurality of reservation acknowledgments, wherein in response to the one transmission reservation request, a reservation acknowledgment received after a previously received reservation acknowledgment indicates a reserved transmission timing different from the reserved transmission timing acknowledged by the previously received reservation acknowledgment.

11. A radio communication apparatus comprising:
a radio transmitting/receiving unit for transmitting a transmission reservation request and for receiving a transmission acknowledgment indicating a period including a plurality of transmission timings as a response to the transmission reservation request; and
a control unit for starting transmission, in accordance with the transmission acknowledgment, by a modulation method that is changed based on a radio communication environment, and for restricting a changing of the modulation method to keep the modulation method during the period indicated in the transmission acknowledgment even if the radio communication environment changes.

12. A radio communication method comprising:
reserving transmission by transmitting a transmission reservation request from a transmitting station and transmitting a transmission acknowledgment to the transmitting station in accordance with the transmission reservation request that indicates a reserved transmission timing; and
transmitting, to the transmitting station, a plurality of reservation acknowledgments with different timing in response to one transmission reservation request, wherein in response to the one transmission reservation request, a reservation acknowledgment transmitted after a previously transmitted reservation acknowledgment indicates a reserved transmission timing different from the reserved transmission timing acknowledged by the previously received reservation acknowledgment.

13. The radio communication system according to claim 1, wherein the reserved transmission timing by the reservation acknowledgment to be transmitted after the previously transmitted reservation acknowledgment is used for an initial transmission of a data packet for which the reserved transmission timing has been acknowledged by the previously transmitted reservation acknowledgment.

* * * * *